US007740676B2

(12) United States Patent
Burnham et al.

(10) Patent No.: US 7,740,676 B2
(45) Date of Patent: Jun. 22, 2010

(54) DUST COLLECTION IN VACUUM CLEANERS

(75) Inventors: Gavin Burnham, Birmingham (GB); Philip Grove, Tipton (GB); Mohammed Irfan, Landsdowne Walk (GB)

(73) Assignee: VAX Limited, Worcestershire (GB)

( * ) Notice: Subject to any disclaimer, the term of this patent is extended or adjusted under 35 U.S.C. 154(b) by 468 days.

(21) Appl. No.: 11/862,806

(22) Filed: Sep. 27, 2007

(65) Prior Publication Data

US 2008/0078148 A1 Apr. 3, 2008

(30) Foreign Application Priority Data

Sep. 29, 2006 (GB) ................................ 0619214.0

(51) Int. Cl.
*B01D 45/12* (2006.01)

(52) U.S. Cl. ............................ 55/345; 55/429; 55/433; 55/459.1; 55/DIG. 3

(58) Field of Classification Search .................. 55/343, 55/345, 429, 432, 433, 459.1, DIG. 3
See application file for complete search history.

(56) References Cited

U.S. PATENT DOCUMENTS 6,546,593 B2 * 4/2003 Oh et al. ....................... 15/353
6,607,572 B2 * 8/2003 Gammack et al. ............. 55/343
2005/0198767 A1 9/2005 Kang et al.
2005/0198770 A1 * 9/2005 Jung et al. .................... 15/353

FOREIGN PATENT DOCUMENTS

EP 1464264 A3 6/2004
EP 1676516 A1 7/2006
GB 2363744 A 1/2002
GB 2365324 A 2/2002

OTHER PUBLICATIONS

Search Report dated Jan. 8, 2007 for priority application GB 0619214.0.

* cited by examiner

*Primary Examiner*—Robert A Hopkins
(74) *Attorney, Agent, or Firm*—Michael Best & Friedrich LLP

(57) ABSTRACT

A cyclonic separator assembly for a vacuum cleaner, the assembly including a first cyclonic separator for effecting a first stage of dust separation from the suction airflow of the cleaner, and at least one further cyclonic separator for further separation of dust from the air flow following the first separator, and a receptacle for separated dust, the receptacle including respective receiving portions for receiving dust separated by the first separator and the further separator(s), wherein the respective portions of the dust receptacle are able to be emptied separately from one another.

12 Claims, 2 Drawing Sheets

DUST COLLECTION IN VACUUM CLEANERS

CROSS-REFERENCE TO RELATED APPLICATIONS

This application claims priority from United Kingdom application number 0619214.0, filed on Sep. 29, 2006, the entirety of which is fully incorporated by reference herein.

BACKGROUND

This invention relates to a dust separator/collector arrangement of the cyclonic type, for a vacuum cleaner (suction cleaner).

Separators of the so-called "cyclonic" type are now well established in the field of vacuum cleaners for separating dust, dirt, and other matter (all herein referred to as "dust") from the suction airflow drawn by a cleaner from whatever is being cleaned. Cyclonic separators avoid or reduce the problem of clogging of filters which, before the adoption of cyclonic separators, were used for dust separation. Very often a bag, either disposable or reusable, was used as the main separation filter for vacuum cleaners in which dust separated by the flow of air through the material of the bag was retained for later disposal.

The present invention relates more particularly to a cyclonic separator/collector assembly which utilises a first cyclonic separator for effecting a first stage of dust separation from the suction airflow of the cleaner, followed by a further cyclonic separator comprising one or more further cyclones, for further such separation. In known such separator/collector assemblies, the first cyclone is usually of a larger size than the further cyclone(s), so that it separates larger and heavier dust particles from the airflow, along with any small objects which might intentionally or otherwise be ingested by the cleaner, while the or each further cyclone is of smaller size so that air circulates at a higher speed therein and lighter and finer dust particles are separated. Some cleaners incorporate a number of further cyclones of small size connected in parallel with one another, giving the possibility of extremely efficient dust separation, although even in these cleaners it is usual to provide a filter or filters after the cyclonic separator/collector assembly.

Because the suction airflow of the cleaner has to pass through a first cyclone and one or more further cyclones in sequence, the dust separated by each cyclonic cleaning stage has to accumulate in separate receptacles, or separate parts of a common receptacle, to be retained until emptying of the receptacle(s). Generally, arrangements have been adopted in which the dust from the different cyclonic stages is emptied together. This has usually been effected either by removal of a single dust receptacle from the separator assembly and inverting the receptacle to empty collected dust therefrom, or by opening a door at the bottom of a dust receptacle part of the separator assembly, to enable accumulated dust to fall from the receptacle. In either case, the receptacle has different collection areas in which the dust separated by the different cyclonic separator stages accumulates.

Such "one step" emptying is convenient, but not always desirable. Frequently, a vacuum cleaner sucks up small items such as toys or parts thereof, or jewelry such as earrings, which are not to be thrown away. Therefore, it is necessary to empty the accumulated dust and search through it for the required article(s). Even though such an article can be expected to have been separated by the first cyclonic separating stage, it will be emptied with all the separated dust including very fine particles separated by the further separating stage. Such fine particles are unpleasant to handle and readily form an airborne dust cloud.

SUMMARY OF THE INVENTION

It is broadly the object of the present invention to address this problem of known cyclonic separators.

According to one aspect of the present invention, we provide a cyclonic separator assembly for a vacuum cleaner, the assembly including a first cyclonic separator for effecting a first stage of dust separation from the suction airflow of the cleaner, and at least one further cyclonic separator for further separation of dust from the airflow after the first cyclonic separator, and a receptacle for separated dust, the receptacle including respective receiving portions for receiving dust separated by the first separator and by the further separator(s) wherein the respective portions of the dust receptacle are able to be emptied separately from one another.

In accordance with the invention, emptying of the portion of the dust receptacle which receives the dust from the first cyclonic separator enables any larger objects which are separated by the first separator to be removed from the larger-sized debris also separated by the first separator, without necessitating the handling of the finer dust and debris separated by the further separator(s). Either the portion which receives dust from the first separator may be emptied first and any required objected retrieved therefrom, after which the dust separated by the further separator(s) can be emptied for disposal. Alternatively, the dust separated by the further separator(s) may be emptied first and disposed of, before the dust separated by the first separator is emptied and dealt with a required.

The receptacle may comprise first and second doors which provide access respectively to the portions of the receptacle which receive dust from the first separator and which receives dust from one or more further separators, the' doors being openable separately from one another.

The doors may be arranged to close respective openings provided at the bottom of the receptacle, and, when they are open, may provide for emptying of dust from the respective portions of the receptacle under gravity, while the receptacle remains in a generally upright orientation.

The doors may be pivotally mounted to the receptacle, and first and second catch means may be provided respectively for holding the first and second doors in their closed positions.

For releasing the respective catch means when the doors are to be opened, first and second releasing devices may be provided. Such releasing devices may be operable independently of one another, or operable in sequence so that the first or second door, as appropriate, may be opened only after the respective other door has been opened.

The first and second doors may be pivotably openable relative to the receptacle, and may open under gravity or possibly with the assistance, or under the influence, of a spring after their respective catch means have been released.

The respective dust-receiving portions of the receptacle may be disposed one inside the other in plan view of the receptacle, in which case one door may be of generally annular form to close the outer dust-receiving portion while the other door closes the inner dust-receiving portion.

In one form of separator assembly, as described hereafter, the receptacle in generally cylindrical in configuration with an outer annular dust-receiving portion and an inner generally cylindrical dust receiving portion. The first, annular, dust receiving portion may receive dust from the first separator, and the inner portion receive dust from the further separator (s). In the embodiments described hereafter, the arrangement of the first and second doors provides for opening of the second door, for emptying of fine dust separated by the further separator(s), prior to opening of the first door for the emptying of coarse dust and any larger objects separated by the first separator.

According to a further aspect of the invention, we provide a vacuum cleaner including a separator assembly according to the first aspect of the invention.

BRIEF DESCRIPTION OF THE DRAWINGS

The invention will now be described by way of example with reference to the accompanying drawings, which.

DETAILED DESCRIPTION OF THE DRAWINGS AND THE PRESENTLY PREFERRED EMBODIMENTS

Figure 1:
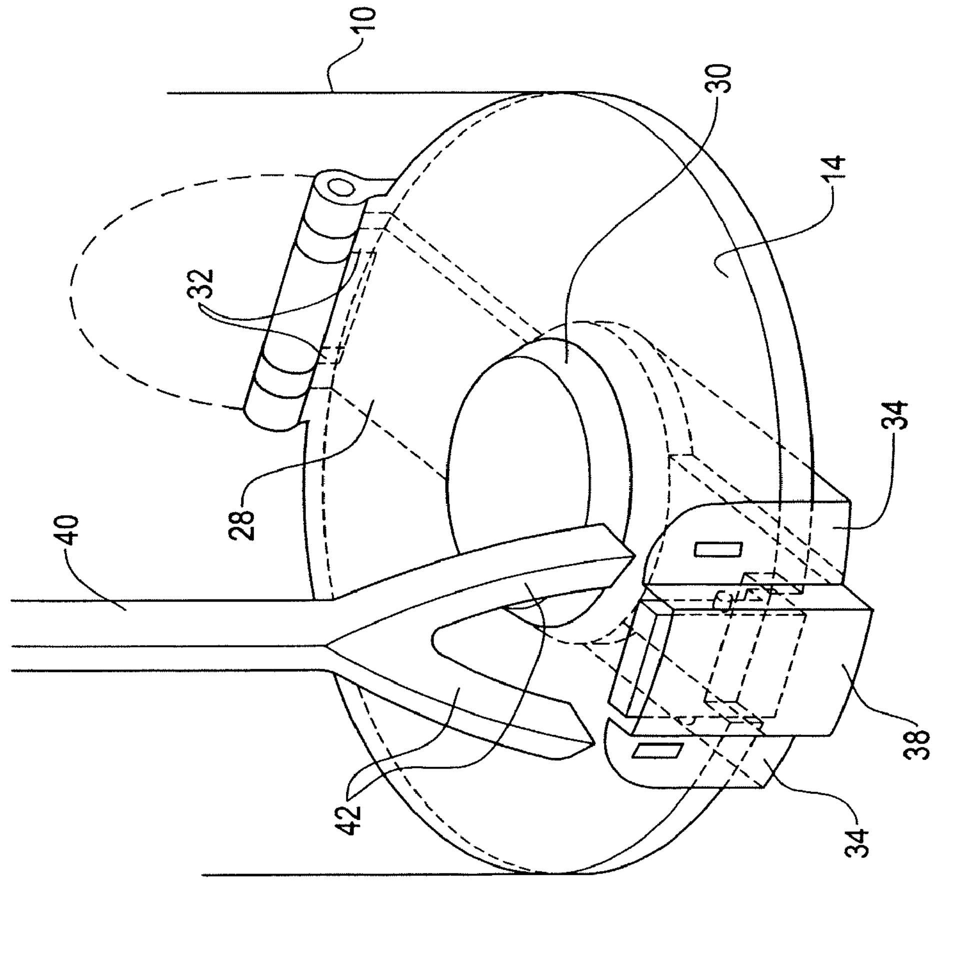
FIG. 1 is a diagrammatic perspective view of part of a receptacle of a dust separator assembly.
Figure 2:
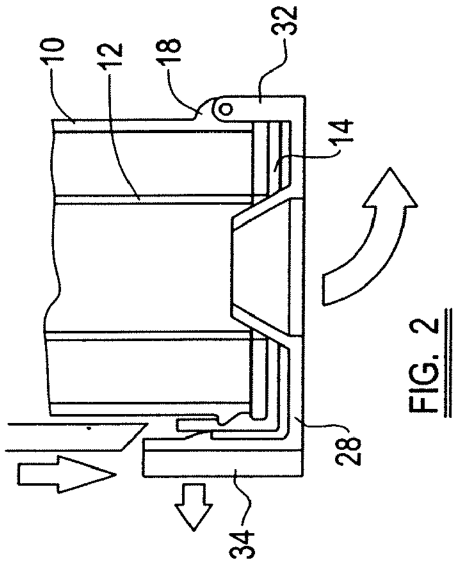
FIG. 2 is a section of the receptacle part of FIG. 1 showing the first and second doors in a closed position.
Figure 3:
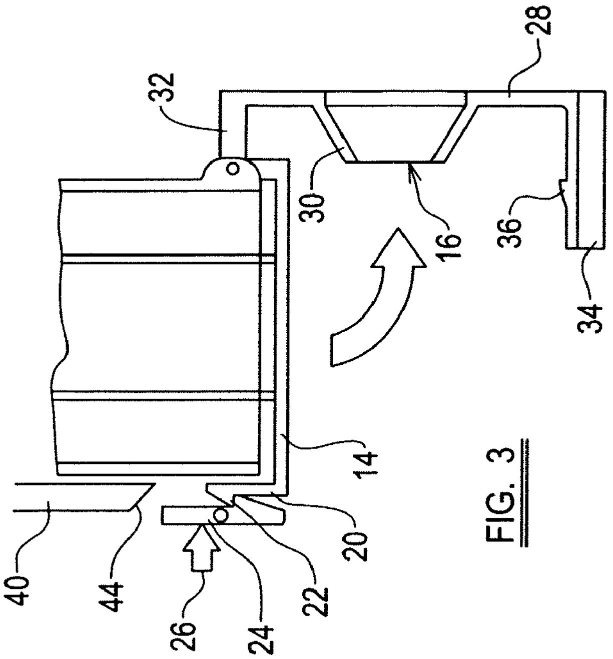
FIG. 3 is the view of FIG. 2 with the second door in an open position.

Referring firstly to FIGS. 1-3 of the drawings, these illustrate part of a dust receptacle of a separator assembly in accordance with the invention. The separator assembly is of a type comprising a first cyclonic separating stage for effecting a first stage of dust separation from the suction airflow drawn by the cleaner from whatever is being cleaned, and at least one further cyclonic separator for further separation of dust from the airflow as it has passed through the first cyclonic separators. As is well known in cyclonic separators, dust separated by the first and further cyclonic separators is retained in respective parts of the dust receptacle assembly.

The illustrated part of the dust receptacle assembly comprises an outer casing wall 10 generally of cylindrical form, and an inner wall 12 also of generally cylindrical form defining an annular space between it and the wall 10. One well known arrangement of cyclonic separating stages has the first stage cyclone formed by the space between the walls 10, 12, into which the incoming suction airflow is directed tangentially at an upper end of the cyclone, so that coarse dust particles and small objects are separated and fall to the bottom of the space between the walls, with the partially-cleaned suction airflow leaving the space between the walls 10, 12 by any appropriate exit port arrangement, also at the upper end of the space. A further cyclonic separating stage is provided by a further cyclone within the wall 12, or one or more further cyclones disposed at an upper end of the separator, with the fine dust separated by the further cyclone(s) falling down within the wall 12 to accumulate at the bottom of the receptacle. Whatever detailed separator arrangement is adopted, the end result is that separated fine dust accumulates within the wall 12 and coarse dust and small objects in the space between the walls 10, 12.

The dust separator and collector assembly may be utilised in a vacuum cleaner of the "upright" type or of the "cylinder" (or "canister") type. In known manner, the entire separator/collector assembly including the receptacle as illustrated may be removable from the vacuum cleaner when emptying of collected dust is required, or possibly a part only of the separator/collector assembly including the receptacle may be removable when dust is to be emptied.

The lower end of the illustrated receptacle is closed by two doors which provide access respectively to the portions of the receptacle which receive dust from the first cyclonic separator and the further cyclonic separator stage. These doors comprises a first door 14 which closes the annular space between the outer casing 10 and inner wall 12, and a second door 16 which closes the space within the inner wall 12. Both doors 14, 16 are pivotally connected to the receptacle, at a lug 18 provided at one side of the receptacle at the bottom of the outer casing wall 10.

The door 14 is of annular configuration to close the annular space between the walls 10, 12, and opposite its pivotal connection to the lug 18 it has an upwardly extending part 20 ending in a catch formation 22. The catch formation 22 is engageable by a catch element 24 pivoted to the outer casing wall 10 of the receptacle, to hold the door closed. The catch element 24 is able to be pivoted by pressing on it as indicated by arrow 26, to release the door 14 to open it.

The door 16 comprises a member 28 which extends diametrically across the bottom of the receptacle casing 10, provided with a generally frusto-conical closure portion 30 which is able partially to enter the bottom of the internal cylindrical wall 12 to block the opening thereof. When both the doors 14, 16 are closed the closure portion 30 of the door 16 extends through the central aperture of the annular door 14. At one end, the member 28 has spaced upstanding portions 32 by which the door is pivoted to the lug 18, while at the other end of the member 28 there are upstanding portions 34 with respective catch formations 36, the portion 34 being spaced circumferentially of the receptacle and the catch formations 36 being engageable with complementary catch formations on the casing wall 10. Between the portions 34, there is a shielding portion 38 which, when the doors 14, 16, are both in their closed position as shown in FIGS. 1 and 2, prevents access to the catch element 24 holding the door 14 closed.

All the components illustrated are preferably mouldings of plastics material, with other materials used or incorporated as appropriate. For example, a spring may be provided for biasing the catch element 24 to pivot to its position in which it engages the catch formation 22 of the door 14 to hold this door closed. Pivoting of the catch element 24 to enable the door 14 to be opened is carried out against the force of such a spring. One or more springs may also be provided for biasing the doors 14, 16 to their open positions, so that they open as soon as their respective catch devices are released.

The catch device holding the door 16 closed is released for opening of the latter by displacing its portions 34 to disengage their catch formations 36 from the complementary formations on the casing wall 10, by deforming the portions 34 to an extent which is permissible by the material from which they are made. To enable such release by a user holding the separator assembly (or receptacle thereof) at an upper portion away from the doors, a release element 40 is provided. This extends upwardly on the exterior of the separator/receptacle, and at its lowermost end is bifurcated into portions 42, respectively having tapered surfaces as indicated as indicated at 44 to engage with the respective portions 34. At its uppermost end, the release element 40 has a part able to be pressed by a user to displace the element 40 downwardly, and, by engagement of its surfaces 44 with the portions 34, disengage the catch formations 36 of the latter to enable opening of the door 16.

Thus, when the coarse and fine dust and other matter collected in the respective parts of the receptacle is to be emptied, the user is able, by operation of the release element 40, firstly to open the door 16 and release fine dust from the space within the wall 12. After disposal of the fine dust, the catch element 24, which is now accessible as it is no longer covered by the shield portion 38, can be released to open the door 14 and release coarse dust and larger articles from the space between the outer and casing wall 10 and inner wall 12.

Figure 4:
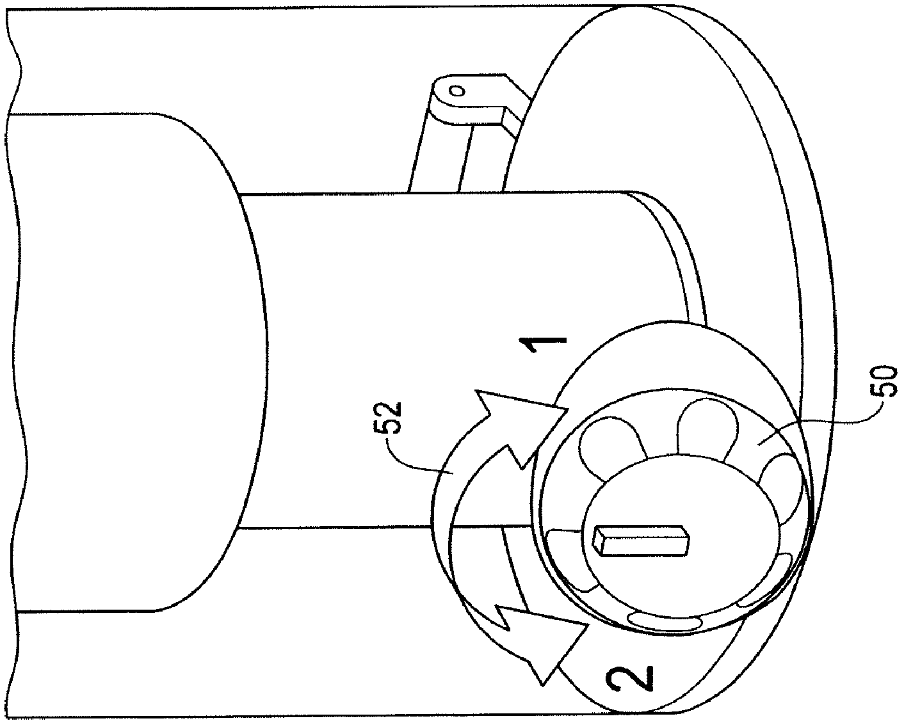
FIG. 4 is a perspective view of another embodiment of a receptacle.

Referring now to FIG. 4, this illustrates, diagrammatically, an alternative arrangement for controlling release of the doors, 14, 16 as shown in FIG. 1. Instead of the respective catch elements and formations, and release element 40, the parts of the doors, 14, 16 remote from their pivotal connection to the case 10 of the receptacle part of the separator assembly are held closed by a retaining element 50 which is fitted to the casing wall 10 and is angularly moveable in opposite directions from a starting point, as indicated by arrows 52. When moved angularly in the clockwise sense, it releases the door 16, and when moved angularly in the anti-clockwise sense it releases the door 14. A mechanism provides for movement of the member 50 only in the first direction followed by the second direction, so that only the door 16 alone can first be opened, followed by the door 14, for emptying of fine dust followed by coarse debris as above described.

Figure 5:
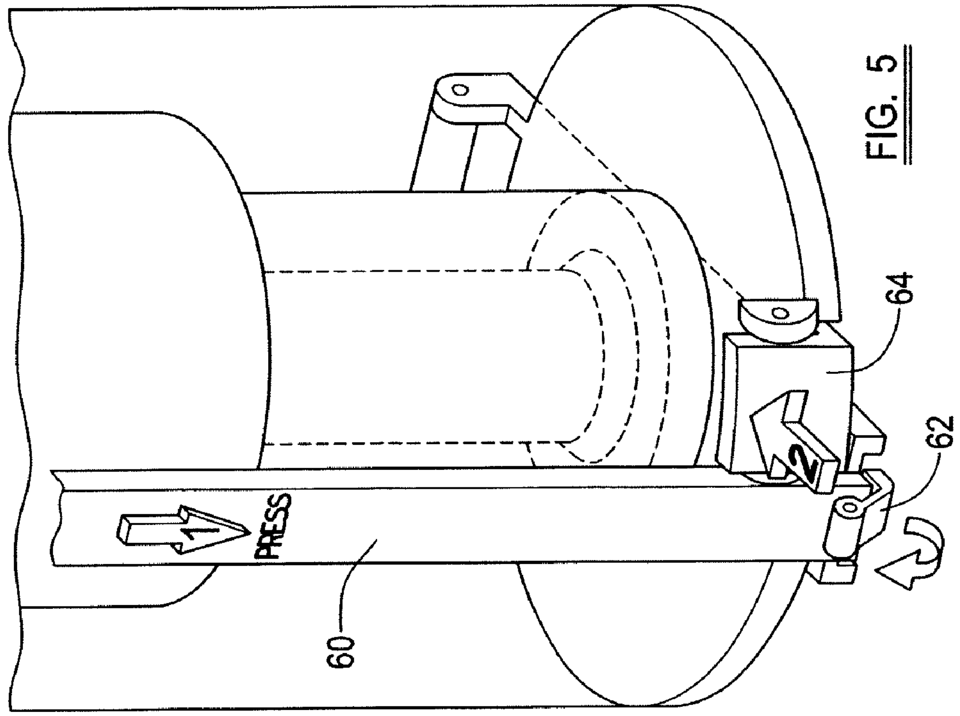
FIG. 5 is a perspective view of yet another embodiment of a receptacle.

FIG. 5 shows an alternative arrangement of catch elements. A release element 60 is shown, whose lowermost end is engageable with a catch element 62 to release the latter and permit the door 16 to be opened. The release element 60 is operated by being pressed downwardly by a user, at a position near the uppermost end of the separator assembly. Subsequently, a catch element 64 which holds the door 14 closed can be released.

When used in this specification and claims, the terms “comprises” and “comprising” and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A cyclonic separator assembly for a vacuum cleaner, comprising a first cyclonic separator for effecting a first stage of dust separation in communication with a suction airflow path within the cleaner, and a second cyclonic separator for separation of dust in communication with the first separator, and a receptacle configured to receive separated dust from the first and second separators, the receptacle comprising a first receiving portion configured to receive dust separated by the first separator, and a second receiving portion configured to receive dust separated by the second separator, wherein the first and second receptacles are configured to be emptied separately.

2. The cyclonic separator assembly of claim 1, wherein the receptacle comprises a first door configured to allow access to the first receiving portion and a second door configured to provide access to the second receiving portion, the first and second doors being openable separately from one another.

3. The separator assembly of claim 2, wherein the first and second doors are movable between a closed position to selectively block respective first and second openings disposed at the bottom of the receptacle, the first and second doors being movable to an alternate position for emptying of dust from the respective first and second portions of the receptacle.

4. The separator assembly of claim 2, wherein the first and second doors are each pivotally mounted to the receptacle, and further comprising a first and a second catch each disposed on the separator for holding the respective first and second doors in the closed position.

5. The separator assembly of claim 4, further comprising first and second releasing devices for releasing the respective first and second catches.

6. The separator assembly of claim 5, wherein the first and second devices are operable independently of one another.

7. The separator assembly of claim 5, wherein the first and second devices are operable only in a predetermined sequence.

8. The separator of claim 4, wherein the first and second doors are pivotably openable under gravity when the respective first and second catches are released.

9. The separator of claim 4, wherein each of the first and second doors are pivotably openable with a spring.

10. The separator of claim 1, wherein the respective first and second dust receiving portions of the receptacle are disposed concentrically with respect to each other.

11. The separator of claim 10, wherein the first door is generally annular and configured to selectively block the outer dust receiving portion, while the second door is configured to selectively block the inner dust receiving portion.

12. The separator of claim 11, wherein the outer dust receiving portion receives dust from the first separator, and the inner dust receiving portion receives dust from the second separator.

* * * * *